(12) United States Patent
Kato et al.

(10) Patent No.: US 7,072,172 B2
(45) Date of Patent: Jul. 4, 2006

(54) SOLID ELECTROLYTIC CAPACITOR

(75) Inventors: Kazuhiro Kato, Higashiosaka (JP); Kenichiro Matsuzaki, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/711,363

(22) Filed: Sep. 14, 2004

(65) Prior Publication Data

US 2005/0057889 A1   Mar. 17, 2005

(30) Foreign Application Priority Data

Sep. 16, 2003 (JP) .............................. 2003-322935

(51) Int. Cl.
*H01G 9/04* (2006.01)
(52) U.S. Cl. ....................... 361/510; 361/531
(58) Field of Classification Search ................ 361/510, 361/523, 528–529, 531, 533, 540
See application file for complete search history.

(56) References Cited

U.S. PATENT DOCUMENTS

| 6,154,358 A  | * | 11/2000 | Fukaumi et al. ............. 361/523 |
| 6,411,498 B1 | * | 6/2002  | Nakamura .................. 361/523 |
| 6,665,172 B1 | * | 12/2003 | Kim et al. .................. 361/523 |

FOREIGN PATENT DOCUMENTS

| JP | 63-293147 |   | 11/1988 |
| JP | 5-243100  | * | 9/1993  |
| JP | 2000-12387 |  | 1/2000  |

* cited by examiner

*Primary Examiner*—Anthony Dinkins
(74) *Attorney, Agent, or Firm*—Armstrong, Kratz, Quintos, Hanson & Brooks, LLP.

(57) ABSTRACT

A solid electrolytic capacitor includes a capacitor element in which an anode lead protrudes from one end of an anode member. An anode lead frame is attached to the anode lead by welding. A contact resistance enlarging portion is formed on a junction face of the anode lead frame with the anode lead, the area over which the anode lead frame comes into contact with the anode lead being smaller than the portion other than the junction face.

6 Claims, 5 Drawing Sheets

SOLID ELECTROLYTIC CAPACITOR

TECHNICAL FIELD

The present invention relates to solid electrolytic capacitors.

BACKGROUND ART

Conventionally, a structure as shown in FIG. 8 is known as a solid electrolytic capacitor (8). The solid electrolytic capacitor includes a capacitor element (15) in which a dielectric oxidized film (2), a solid electrolytic layer (3), and a cathode lead layer (4) made of carbon or silver, for example, are formed in that order on a surface of an anode member (1), which is made of a sintered valve metal (tantalum, niobium, titanium, or aluminum, for example). The solid electrolytic layer (3) is made of conductive inorganic material such as manganese dioxide, or conductive organic material such as TCNQ complex salt or conductive polymer. A bar-shaped or plate-shaped anode lead (16) protrudes from one end of the anode member (1). It is possible to feed a great amount of current through the plate-shaped anode lead (16), as disclosed in JP 2000-12387A.

An anode lead frame (20) is fastened to this anode lead (16) by resistance welding or the like, and a cathode lead frame (21) is fastened to the cathode lead layer (4) by a conductive adhesive (5). The lead frames (20) and (21) are the boards made of copper or an alloy whose principal component is copper (see JP S63-293147A), in view of conductivity and thermal conductivity. It is possible to make the internal resistance of the capacitor small if the conductivity of the lead frames (20) and (21) is high. A housing (7) made of epoxy resin, for example, covers the outside of the capacitor element (15).

However the above-described capacitor has the following problem: The lead frames (20) and (21) are made of a material with high conductivity and high thermal conductivity. Therefore, when fastening the anode lead (16) by resistance welding, the generated joule heat and the applied current are conducted from the locations to be welded to other locations. As a result, welding strength of the resistance welding is not consistent and the anode lead (16) is easily detached from the anode lead frame (20).

DISCLOSURE OF THE INVENTION

It is an object of the present invention to stabilize the welding strength when the anode lead (16) and the anode lead frame (20) are fastened by resistance welding.

A contact resistance enlarging portion is formed on a junction face (22) of the anode lead frame (20) with the anode lead (16), the area over which the anode lead frame comes into contact with the anode lead being smaller than the portion other than the junction face (22). The contact resistance enlarging portion (52) may be constituted by any one of grooves (30), mottled portions (31), dimple portions (32), and protusions and depressions that are provided on the junction face (22).

In accordance with the present invention, the contact area between the anode lead (16) and the anode lead frame (20) is smaller than conventionally. Therefore the contact resistance increases, joule heat tends to increase and the amount of heat conduction becomes smaller when the parts are fastened by resistance welding. Hence, less heat is released from the welding location, the anode lead (16) and the anode lead frame (20) become easily welded and the welding strength is stabilized.

BEST MODE FOR CARRYING OUT THE INVENTION

EMBODIMENT 1

Figure 8:
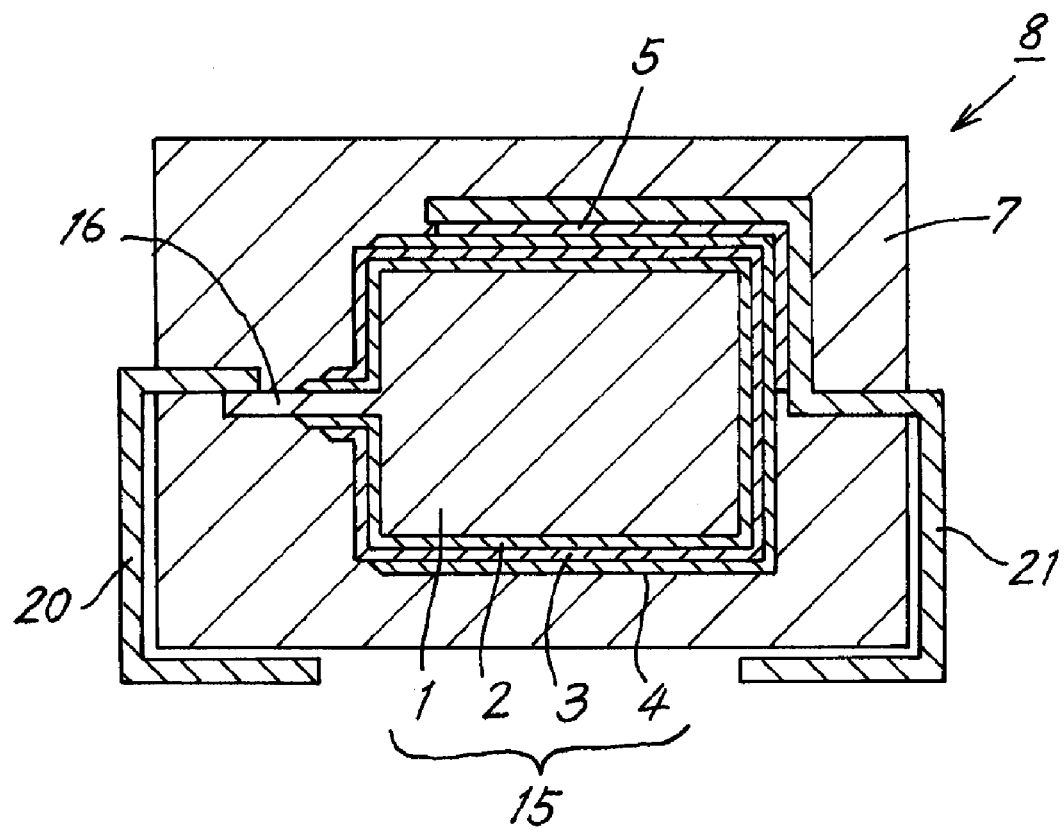
FIG. 8 is a cross-sectional view of a conventional solid electrolytic capacitor.

The overall structure of a solid electrolytic capacitor (8) of the present invention is similar to that of the conventional solid electrolytic capacitor shown in FIG. 8. An anode lead frame (20) is formed using copper or an alloy whose principal component is copper, for example.

Figure 1:
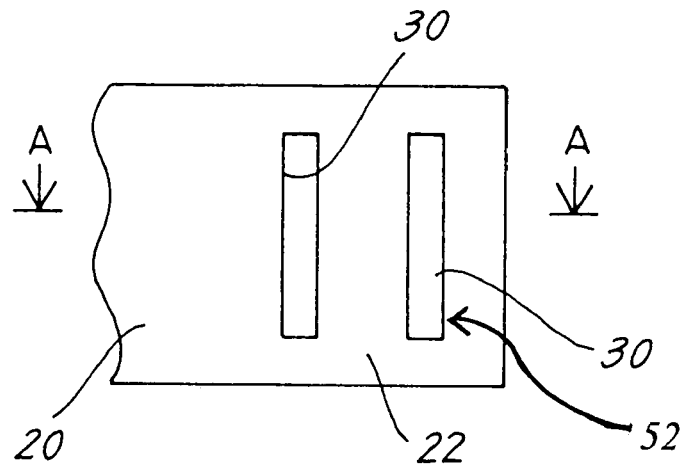
FIG. 1(a) is a bottom view showing a junction face of an anode lead frame with an anode lead.
FIG. 1(b) is a cross-sectional view along the A—A line in FIG. 1(a).
Figure 1:
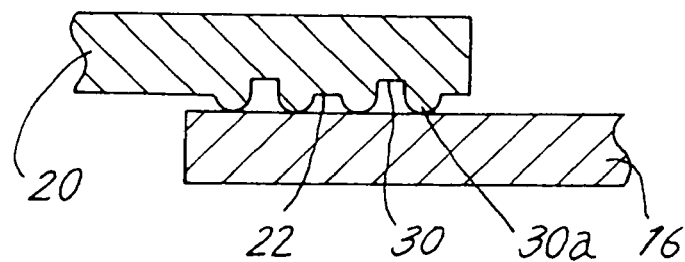

FIG. 1(a) is a bottom view showing a junction face (22) of the anode lead frame (20) that is connected to the anode lead (16) and FIG. 1(b) is a cross-sectional view taken along the A—A line of FIG. 1(a). Grooves (30) that are substantially perpendicular to the longitudinal direction of the anode lead frame (20) are provided in the junction face (22). The junction face (22) and the anode lead (16) contact each other only at the edge portions of the grooves (30), and the area in which the anode lead frame (20) and the anode lead (16) are in contact is small.

Therefore, the contact resistance between the anode lead frame (20) and the anode lead (16) increases. In other words, a contact resistance enlarging portion is formed by providing the grooves (30) on the junction face (22).

For this reason, when performing resistance welding, joule heat tends to increase and the amount of heat conduction becomes smaller. Hence, less heat is released, the anode lead (16) and the anode lead frame (20) are easily welded and the welding strength is stabilized. Because it is possible to perform resistance welding at a lower voltage than in the conventional article, it is possible to reduce the load on the capacitor element (15). By this, capacitor properties such as leakage current can be improved.

Since the grooves (30) are formed by press working the anode lead frame (20), there are protrusion portions (30a) at the edge portions of the grooves (30). However, it is also possible to remove the protrusion portions (30a) by etching, for example.

Figure 2:
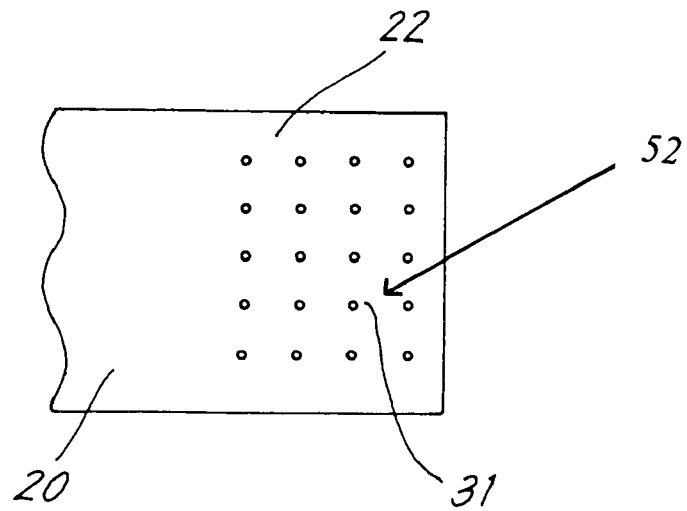
FIG. 2 is a bottom view of another anode lead frame.

It should be noted that a mottled portions (31) may be provided on the junction face (22) of the anode lead frame (20) with the anode lead (16), as shown in FIG. 2.

Figure 3:
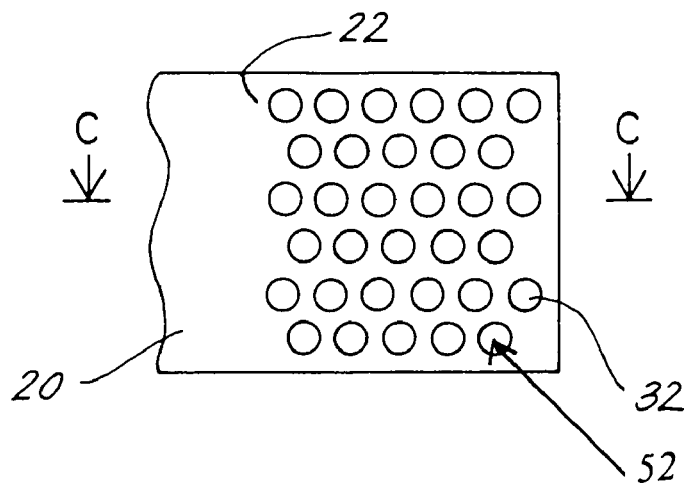
FIG. 3(a) is a diagram of an underside of a junction face of yet another anode lead frame with the anode lead.
FIG. 3(b) is a cross-sectional view along the C—C line in FIG. 3(a).
Figure 3:
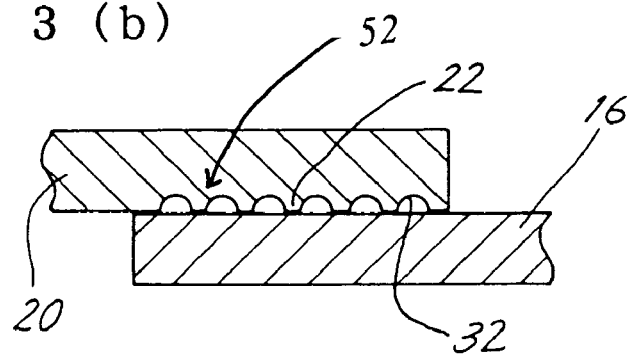

It is also possible to provide dimple portions (31) on the junction face (22) of the anode lead frame (20) with the anode lead (16), as shown in FIGS. 3(a) and 3(b).

Figure 4:
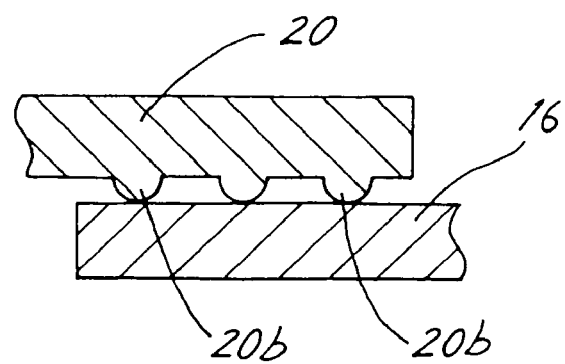
FIG. 4 is a cross-sectional view of still another anode lead frame.

It is further possible to provide protrusions (20b) on the anode lead frame (20) and fasten these protrusions (20b) to the anode lead (16) by resistance welding, as shown in FIG. 4. The area in which the anode lead (16) and the anode lead frame (20) are in contact is small before resistance welding, but the area becomes larger after resistance welding as the protrusions (20b) dissolve. As a result, it is possible to make the internal resistance of the solid electrolytic capacitor equally small as that of the conventional article using the flat anode lead (16).

Figure 5:
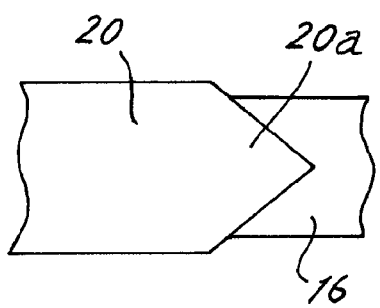
FIGS. 5(a) and (b) are bottom views of yet still another anode lead frame.
Figure 5:
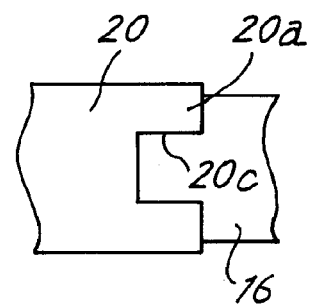

Also, as the bottom view in FIG. 5(a) shows, a front end portion (20a) of the anode lead frame (20) may be formed to an angular shape. The same effect can be obtained by forming the front end portion (20a) of the anode lead frame (20) into a notch (20c) and welding both sides of the notch (20c) by resistance welding, as shown in the bottom view of FIG. 5(a). It is also possible to make a plurality of the notches (20c).

In this embodiment, copper or an alloy whose principal component is copper is used as the anode lead frame (20), but the anode lead frame is not limited to copper or an alloy whose principal component is copper as long as the material has high conductivity and high thermal conductivity. For example, the same effect can be obtained when an aluminum alloy or nickel alloy is used. The grooves (30) of the anode lead frame (20) are not limited to the shape, number, or arrangement shown in FIG. 1. The same effect can be obtained as long as there are depression and protrusions formed in the junction face (22) of the anode lead frame (20) with the anode lead (16).

EMBODIMENT 2

In the embodiment above, the contact resistance enlarging portion is formed on the anode lead frame (20), but in this embodiment, the contact resistance enlarging portion is formed on the plate-shaped anode lead (16).

Figure 6:
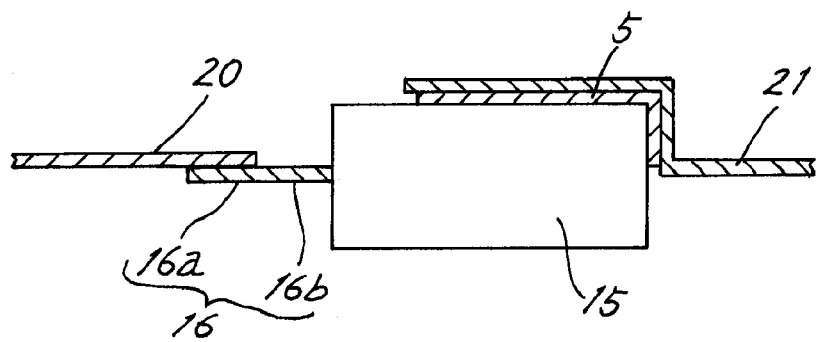
FIG. 6(a) is a lateral view of another anode lead and an anode lead frame and FIG. 6(b) is a bottom view thereof.
Figure 6:
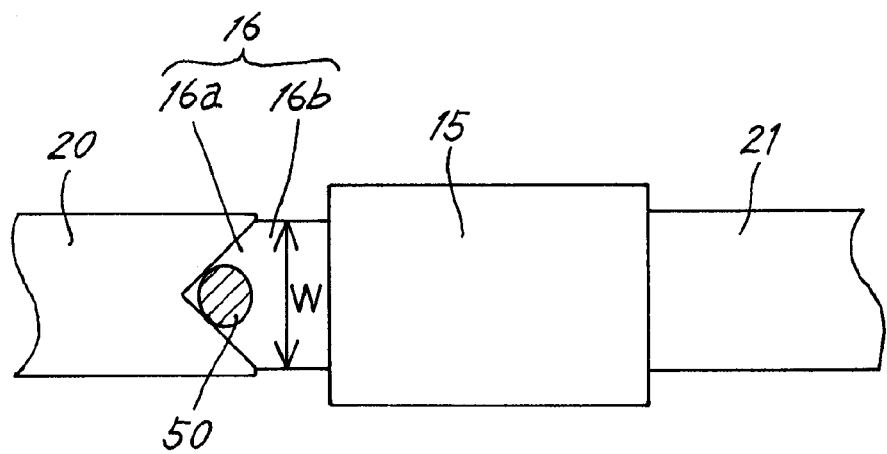

FIG. 6(a) is a lateral view of the anode lead (16) and the anode lead frame (20) and FIG. 6(b) is a bottom view thereof. A front end portion (16a) of the anode lead (16) is processed to an angular shape and the width of the front end portion (16a) is narrower than the width W of the base end portion (16b). The anode lead (16) and the anode lead frame (20) are fastened by resistance welding at a welding portion (50) of this front end portion (16a).

Also in this structure, the area in which the anode lead frame (20) and the anode lead (16) are in contact is small. Therefore, the contact resistance between the anode lead frame (20) and the anode lead (16) increases, and when performing resistance welding, joule heat tends to increase and the amount of heat conduction becomes smaller. The anode lead (16) and the anode lead frame (20) are easily welded and the welding strength is stabilized.

Figure 7:
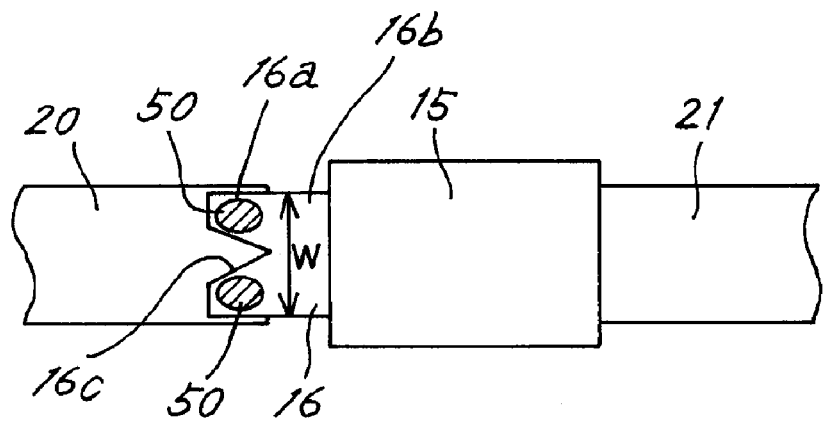
FIGS. 7(a), (b), and (c) are bottom views of still further anode leads and anode lead frames.
Figure 7:
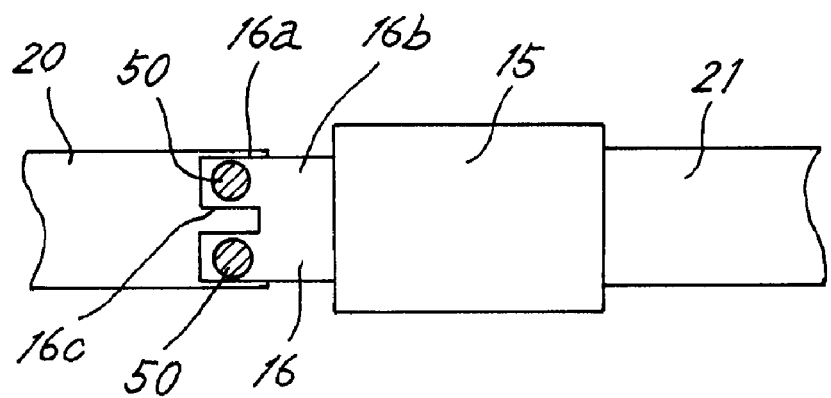
Figure 7:
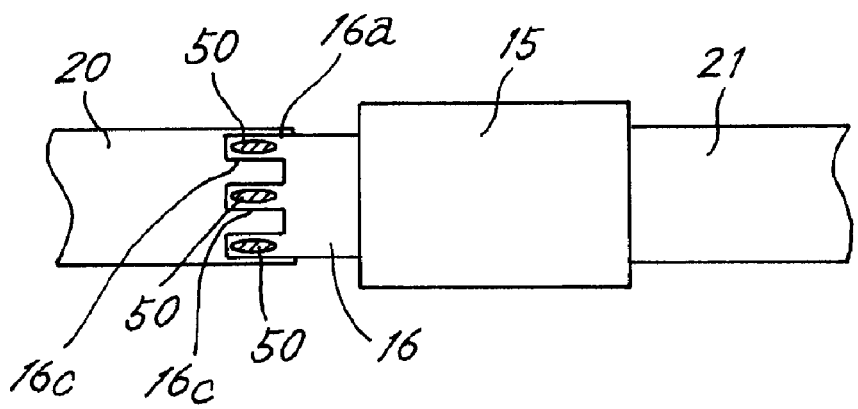

Also, as FIG. 7(a) shows, a triangular notch (16c) can be formed on the front end portion (16a) of the anode lead (16), and the anode lead (16) and the anode lead frame (20) can be welded (50) on both sides of the triangular notch (16c).

As FIG. 7(b) shows, the notch (16c) may be rectangular, and, as FIG. 7(c) shows, it is also possible to provide a plurality of notches (20c). When using the anode lead (16) made of valve metal such as tantalum and the anode lead frame (20) made of an alloy of copper, for example, the rise of joule heat is favorable and it is easier to perform resistance welding when the contact resistance enlarging portion is formed on the anode lead (16), which has the greater resistance.

What is claimed is:

1. A solid electrolytic capacitor comprising:
   a capacitor element in which a plate-like anode lead protrudes from one end of an anode member, and a plate-like anode lead frame being laid on and attached to the anode lead by welding forming a portion for junction;
   wherein a contact resistance enlarging portion is formed on the anode lead frame at the portion for junction where a contact area over which the anode lead frame comes into actual contact with the anode lead being smaller than an area of the portion for junction.

2. A solid electrolytic capacitor comprising:
   a capacitor element in which a plate-like anode lead protrudes from one end of an anode member, and a plate-like anode lead frame being laid on and attached to the anode lead by welding forming a portion for junction;
   wherein a contact resistance enlarging portion is formed on the anode lead at the portion for junction where a contact area over which the anode lead comes into actual contact with the anode lead frame being smaller than an area of the portion for junction.

3. The solid electrolytic capacitor according to claim 1, wherein the contact resistance enlarging portion includes any one of grooves, mottled portions, dimple portions, and protrusions and depressions that are provided on the surface of anode lead frame at the portion for junction.

4. A solid electrolytic capacitor comprising:
   a capacitor element in which a plate-like anode lead protrudes from one end of an anode member, and a plate-like anode lead frame being laid on and attached to the anode lead by welding forming a portion for junction;
   wherein a contact resistance enlarging portion is formed at the portion for junction by forming a front end portion of the anode lead frame or the anode lead to an angular shape or a notched shape.

5. The solid electrolytic capacitor according to claim 1, wherein the welding is a resistance welding.

6. The solid electrolytic capacitor according to claim 4, wherein the welding is a resistance welding.

* * * * *